United States Patent [19]

Martin

[11] 4,319,402
[45] Mar. 16, 1982

[54] CHASSIS GAGING SYSTEM

[76] Inventor: William T. Martin, 9583 Geyser Ave., Northridge, Calif. 91324

[21] Appl. No.: 44,419

[22] Filed: Jun. 1, 1979

[51] Int. Cl.³ .......................... G01B 3/38; G01B 5/14; G01B 5/25
[52] U.S. Cl. .......................... 33/180 AT; 33/181 AT; 33/392
[58] Field of Search ............ 33/180 AT, 288, 181 AT, 33/203.18, 203.19, 203.20, 392, 193

[56] References Cited

U.S. PATENT DOCUMENTS

| | | | |
|---|---|---|---|
| 2,713,211 | 7/1955 | Fella | 33/392 |
| 3,805,396 | 4/1974 | Hunnicutt | 33/180 AT |
| 4,006,532 | 2/1977 | Hallman | 33/288 |
| 4,031,633 | 6/1977 | Bjork | 33/180 AT |
| 4,055,899 | 11/1977 | Dean | 33/193 |
| 4,165,567 | 8/1979 | Olsson | 33/180 AT |
| 4,207,687 | 6/1980 | Bayorgeon et al. | 33/180 AT |

*Primary Examiner*—Steven L. Stephan
*Attorney, Agent, or Firm*—Allan M. Shapiro

[57] ABSTRACT

The gaging system is for measuring the position of reference locations on an automobile chassis with respect to the standard location at proper configuration. The gaging system comprises a locator bed with a replaceable grid paper thereon which has standard locations marked on the grid paper. Adjustable length plumb lines are supported from the reference locations and, when the chassis is in correct configuration, the plumb bobs point to the location marks on the grid paper. The locator bed can be removed for chassis bending, but the plumb lines and their bobs can remain in place during the bending operation.

16 Claims, 7 Drawing Figures

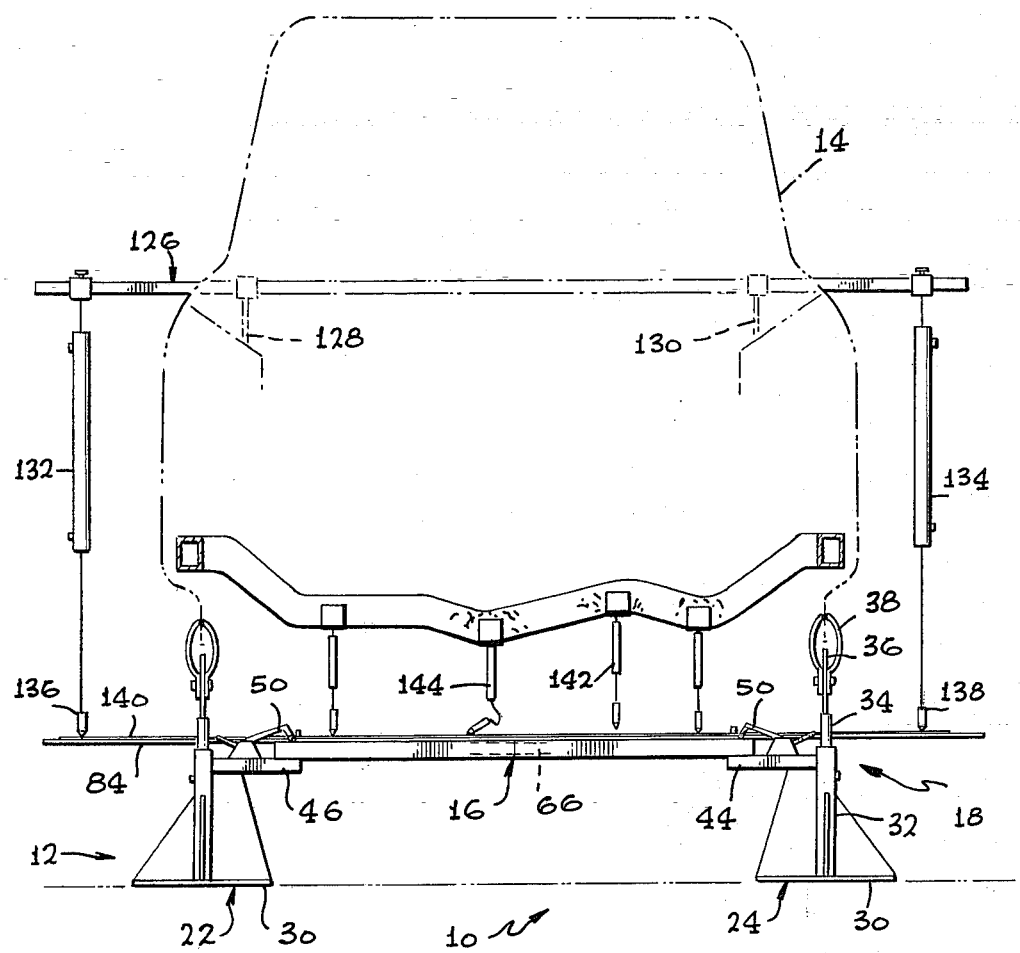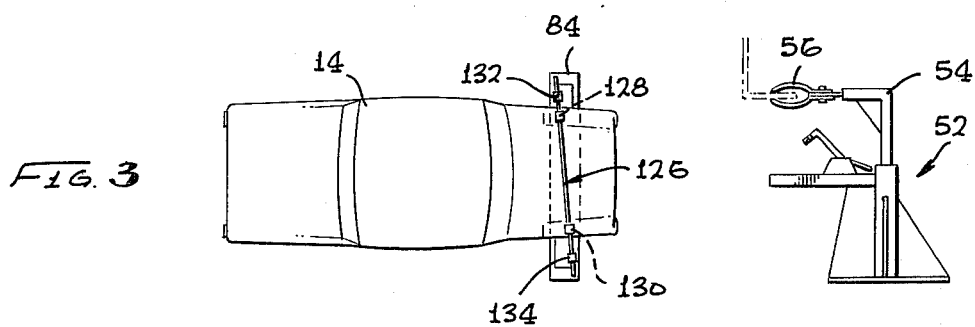

CHASSIS GAGING SYSTEM

BACKGROUND OF THE INVENTION

1. Field of the Invention

This invention is directed to a system wherein an automobile chassis can be gaged to determine whether or not it is in its correct configuration. The gaging system includes locator marks on a locator bed and plumb lines supported from reference locations on the chassis, and correct chassis configuration is indicated when the plumb bobs are at the locator marks.

2. Brief Description of the Prior Art

When an automobile crashes, its chassis is subjected to considerable stress and oftentimes is bent out of shape. Furthermore, sometimes in original manufacture or in transport of a new automobile, the chassis is not properly originally configured or is bent out of shape by the forces applied to the chassis during its transport.

The chassis of each automobile has reference surfaces and locations thereon. When these are in the correct configuration, then the chassis is straight. In order to measure the straightness, one method is to place a reference platform beneath the chassis and then place stands on the reference platform. The reference platform can carry horizontal indicia thereon so that, by measuring and counting, the stands can be properly located in the horizontal directions. The stands are adjustable in the upright direction and are moved to the predetermined height to reach the reference point on the chassis. The location of the reference point is engaged in this manner and then compared to where it should be so that deviation from standard is established. Now, the stands and the reference platform are removed to prevent damage to the delicate measuring devices. The chassis is then bent in a direction and to an amount believed to bring it to the standard configuration. Thereupon, the reference platform is replaced, each of the stands is replaced on its proper location on the reference platform, and the height to the reference locations is measured. In this way, by repetitive placement and removal, with intermediate bending steps, the chassis is brought into the correct configuration. This procedure is extremely time-consuming, often inaccurate, and frequently leads to overworking of the chassis material due to the trial-and-error nature of the method and the absence of the gaging hardware during the actual bending operations.

SUMMARY OF THE INVENTION

In order to aid in the understanding of this invention, it can be stated in essentially summary form that it is directed to a chassis gaging system wherein a locator bed is placed under a chassis and adjustable length plumb lines are placed into reference locations on the chassis with the plumb bobs hanging down to locator marks on the locator bed. The plumb lines are of adjustable length so that, when the chassis is in the correct configuration, the plumb bobs touch the locator marks. The locator bed with its locator marks can be removed, if desired, without disturbing the plumb lines and bobs.

Accordingly, it is an object of this invention to provide a chassis gaging system which incorporates a locator bed which can be positioned with respect to a chassis and incorporates plumb lines and bobs which can be secured to a chassis to hang from reference locations thereon. It is another object to provide plumb lines of adjustable length so that in such a system the plumb bobs hang down to locator marks from reference locations on the chassis when the chassis is in its correct configuration and indicates deviation from the correct configuration when the plumb bobs do not meet the locator marks. It is a further object to provide a chassis gaging system which is useful for a large number of different makes and models of chassis by having exchangeable grids carrying locator marks so that, for each model, the correct set of locator marks is employed.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 2 is an elevational view of the preferred embodiment of the chassis gaging system of this invention in a larger scale than shown in FIG. 1, as seen from the rear of the automobile.

FIG. 3 is a plan view thereof on reduced scale.

FIG. 7 is an elevational view showing an alternative chassis support clamp in association with the locater bed support.

DESCRIPTION OF THE PREFERRED EMBODIMENT

The proper life of an automobile and the roadability handling of the automobile require the chassis be in the correct configuration. To determine where chassis bending should be applied and to determine the direction and amount of chassis bending, the chassis must first be measured to determine its deviation from the standard configuration. Chassis are provided with reference holes throughout the assembly. These reference holes are used during the manufacture and shaping of the individual parts and are used during the securement together of the individual parts into the final chassis configuration. Since these holes are reference locations through the manufacturing process, they serve as the important prime source of location information for determining whether or not the chassis is in its proper configuration.

By employing the reference openings in the chassis for chassis gaging, then the reference locations used throughout the manufacturing operation are employed. This is much more direct for gaging, rather than going to surfaces, flanges or other parts of the chassis which do not serve as prime reference locations.

Figure 1:
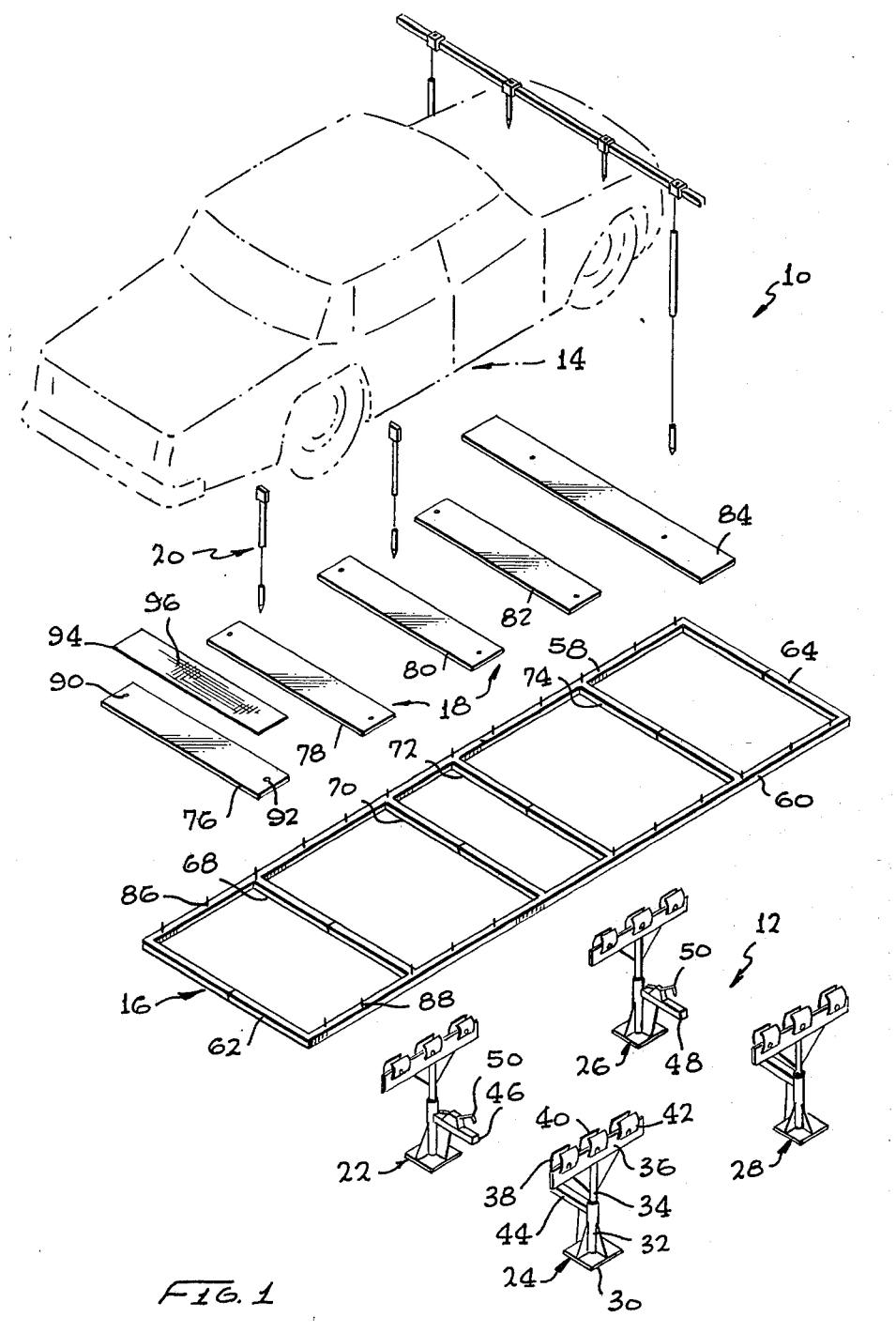
FIG. 1 is an expanded isometric view of the preferred embodiment of the chassis gaging system of this invention, with an automobile shown in dashed lines to show its relationship to the gaging system.

The chassis gaging system of this invention is generally indicated at 10 in FIGS. 1 and 2. Starting from the bottom, it comprises a plurality of stands, indicated generally at 12, which support both chassis 14 and locator bed 16. A plurality of panels 18 are removably mounted on locator bed 16, and each individually carries grid paper thereon which carries location markings for each of the reference locations. Adjustable plumb lines, indicated generally at 20, are mounted in reference location holes in the chassis 14 and hang with their bobs pointed toward the locator marks on the grid paper.

The stands which support the chassis are generally indicated at 12, and this set of stands is comprised of individual stands 22, 24, 26 and 28. The four stands are identical, and each rests on the floor and supports a portion of the chassis. As is best seen in FIG. 2, stand 24 has a floor-engaging plate 30 on which is supported slotted tube 32. Jack post 34 is slidably mounted in tube 32 and can be clamped therein at the desired height position. The top of jack post 34 carries crossbar 36, see FIG. 1, on which are mounted three clamps 38, 40 and 42. These clamps each comprise a pair of jaws which can be clamped on a lower flange on the chassis, as indicated in FIG. 2. In this way, the chassis is supported from the floor in a sufficently raised position to provide access to the underside thereof. The vertical adjustment of jack post 34 accommodates for unevenness of the floor.

Support pad 44 is mounted on tube 32 in a manner in which the support pad 44 can be adjusted in the vertical direction. The four support pads on the four stands provide for support of locator bed 16. For this reason, the support pads must be positioned in a horizontal plane, and the adjustable positioning of the support pads permits them to be adjusted into this coplanar horizontal position. Support pads 46 and 48 are shown on stands 22 and 26 of FIG. 1, and the corresponding support pads on stands 24 and 28 are hidden in FIG. 1. Quick release clamps are provided on each of the stands to clamp locator bed 16 down onto the support pads. A quick release clamp is indicated at 50 in FIG. 2 with respect to stand 24.

Stand 52, shown in FIG. 7, is the same as stand 24 except that its jack post 54 has an angular head thereon with the clamps 56 oriented in a horizontal plane to engage on an outturned chassis flange. Stand 52 is also provided with the above-described support pad and quick release clamp. Stand 52 is used in those locations where support on a horizontally extending chassis flange is desired or required.

Locator bed 16 is a horizontal framework which is clamped down upon the support pads of the stands. Locator bed 16 has siderails 58 and 60 and end rails 62 and 64. The rails are preferably tubular for maximum strength and minimum weight. In order to permit convenient storage of the bed, each of the end and side rails is divided at its center point, and a connector bar is inserted into the two tubes to join them at the division point. Connector bar 66 is shown in FIG. 2. The dividing points of the rails are also visible in FIG. 1. In use, locator bed 16 is used in one piece, and a fair amount of rigidity is required, even though the bed is dismountable. Crossbars 68, 70, 72 and 74 are provided to aid in strengthening the bed. The crossbars are tubular and are plugged onto connector tees extending from the side rails. Where space is not at a premium, the locator bed 16 can be shipped in the disassembled condition and, thereafter, permanently assembled together through the use of connector bars as indicated.

A plurality of locator pins are fixed into side rails 58 and 60 and extend upwardly. The locator pins are accurately positioned and are for the placement of panels 18.

The panels are generally indicated at 18 in FIG. 1 and specifically comprise a plurality of panels such as panels 76, 78, 80, 82, and 84. Two of the locator pins are specifically indicated at 86 and 88 in FIG. 1, and these locator pins respectively engage in holes 90 and 92 in panel 76. Each of the other panels has suitable locator holes which are placed over the corresponding locator pins.

Figure 4:
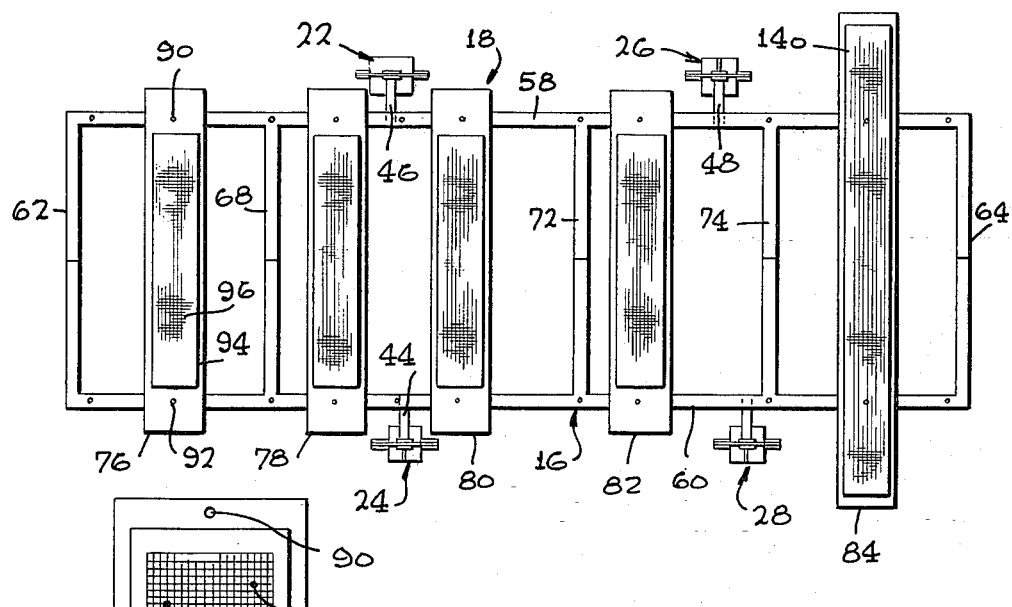
FIG. 4 is a plan view on reduced scale, as compared to FIG. 2, showing the locator bed together with its supports in accordance with this system.
Figure 5:
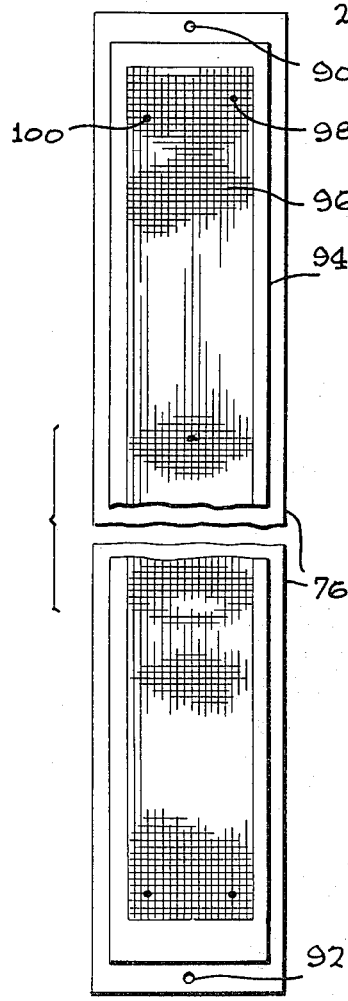
FIG. 5 is an enlarged plan view, with parts broken away, of a portion of the locator bed showing locator marks on the grid paper.

Grid paper is placed on each panel. Grid paper 94 is placed on panel 76, see FIGS. 1, 4 and 5. Grid paper 94 has grid indicia 96 printed thereon and, in the preferred embodiment, the grid indicia include particular locator points printed on the grid paper. A plurality of such locator points is shown in FIG. 5, and two are indicated at 98 and 100. In the preferred embodiment and in particular the embodiment with locator points 98 and 100 and the other locator points printed thereon, the grid paper is specific to a particular model of automobile, and is specific to particular reference locations on the chassis. Such a printed grid paper would have printed thereon the panel location and would carry printed thereon the proper plumb line and bob length.

The plumb lines 20 are mostly identical. They have a tubular body 102 from which extends upwardly shank 104. Shank 104 has a ball end 106 which is engaged within U-shaped spring 108. U-shaped spring 108 has slot 110 which extends around the curved portion of the spring at least 180 degrees. The ball end 106 is engaged inside of the spring, and shank 104 extends through slot 110. In this way, the tubular body 102 can hang pendantly from spring 108. The free ends of spring 108 are slightly outturned to form hooks 112 and 114. The dimensions of spring 108 and its hooks are such that the spring can be manually compressed across its U-shaped configuration and the hooks inserted into one of the reference location holes in the chassis. Thereupon, release of the spring permits the hooks to firmly engage in the reference location. The spring is oriented in the reference location hole in such a manner that slot 110 is in the vertical orientation so that tubular body 102 can pendantly hang from the reference location.

Rod 116 is slidably mounted in body 102 and can be clamped at the desired axial position by means of screw 118. Screw 118 is threadedly engaged in tubular body 102, and its inner end clamps directly onto rod 116. Secured in the lower end of rod 116 is flexible member 120. Flexible member 120 is preferably fairly inextensible, but is still sufficiently limp so that the bob can freely hang. Flexible member 120 is thus preferably a prestretched, braided steel cable made of very fine strands so that considerable flexibility is achieved with maximum inextensibility. Plumb bob 122 is attached to the lower end of flexible member 120. Plumb bob 122 has point 124 for precise pointing. The overall length of the adjustable plumb bob assembly 20 is set in accordance with the requirements of particular reference locations and, preferably, these length requirements are printed on the grid paper with respect to each locator point so that each individual adjustable plumb bob assembly can be adjusted to length in accordance with the particular locator point with which it is associated.

Figure 6:
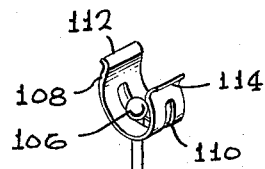
FIG. 6 is a perspective view of a plumb line and bob of adjustable length which is secured in reference locations in the chassis.

Most of the reference locations on the chassis are underneath so that the plumb bob can hang down therefrom directly to a grid paper. Few points in the higher portions of the chassis need be precisely located because they have minimal effect on the life and handling of the vehicle. However, some models have portions of the front wheel suspension anchored high up in the chassis toward the front. In order to reach these specific points, crossbar 126 is used, see FIG. 1. Points 128 and 130 extend downwardly from the crossbar and are adjustably mounted thereon. These points engage in the reference locations at the front of the vehicle over the front suspension. Plumb bob assemblies 132 and 134, see FIG. 2, hang down from the outer ends of crossbar 126 outward of the vehicle body. Plumb bob assemblies 132 and 134 are similar to the plumb bob assembly 20 described in connection with FIG. 6, except for the greater length thereof and the upper fastening thereof. Any convenient upper clamp can secure the plumb bob assemblies 132 and 134 to the desired position on crossbar 126. By this assembly, the plumb bobs 136 and 138 hang down toward the grid paper 140 mounted on panel 84. As seen in FIGS. 1, 2 and 4, the panel 84 is wider than the other panels to accommodate this greater width due to the crossbar 126 extending outward from the body and chassis. FIG. 3 illustrates a situation wherein these reference locations on the chassis are out of line to swing crossbar 126 to thus indicate the chassis misalignment.

In use, the chassis is mounted upon its stands, and the stands are appropriately leveled to properly support the chassis. The support pads on the stands are adjusted to locate a plane at a precise distance below the chassis and in the correct orientation thereto, preferably parallel to both lateral and longitudinal reference lines through the chassis. The panels 18 are located on the correct locating pins on locator bed 16, and the specific grid papers are properly located on each of the panels. Each of the adjustable plumb bob assemblies 20 is adjusted for the correct length for its location, and its U-shaped spring clip is clipped into the reference location hole in the chassis appropriate with that particular locator point. When the chassis is straight and in line, that is, each chassis reference location is where it should be, each of the plumb bob points will point directly to the locator points on the grid paper, and the plumb bob point will very nearly touch that locator point on the paper. When that particular reference location on the chassis is bent up, for example at the plumb bob 142 in FIG. 2, then the point will be short of the paper indicating a required downward bend at that point of the chassis. When the chassis is too low, this will be indicated by the plumb bob lying on the grid paper, for example, plumb bob 144 in FIG. 2. In this way, irregularity in the chassis configuration is indicated. The location of the irregularity and the direction and amount to bend the chassis to bring it into proper configuration is also indicated. To do the bending, if necessary, locator bed 16 can be unclamped from the stands and moved out of the way. Now, bending equipment can be brought in and attached to the chassis to apply the necessary bending forces. There is no need to remove the adjustable plumb bob assemblies 20, except perhaps where a particular locator hole is to be engaged by the bending equipment. Thus, there is no need to dismount any of the plumb bobs most of the time. Immediately, it can be determined whether or not the bending operation has been correctly accomplished. In most cases, the locator bed can be left in gaging position. No complicated disassembly or assembly is required, and thus a minimum amount of effort is required to accomplish accurate and repetitive gaging.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A chassis gaging system comprising:
   chassis stands for the support of an automotive vehicle;
   a locator bed having a panel thereon and a removable replaceable paper carrying grid indicia positioned on said panel, said grid indicia-carrying paper having plumb bob predetermined length information thereon; means for supporting said locator bed beneath the vehicle supported on said stands; and
   a plumb bob assembly for attachment into a particular reference location opening in the vehicle chassis, said plumb bob assembly having a predetermined length for that particular reference location for having its plumb bob hang freely to said grid indicia on said removable replaceable paper for indicating the deviation of the particular reference location opening in which said plumb bob assembly is attached from the desired configuration of the vehicle chassis by deviation both laterally and lengthwise of said plumb bob from said grid indicia on said paper, said plumb bob assembly being adjustable in length so that its length can be adjusted to said predetermined length in accordance with length information on said paper.

2. A chassis gaging system comprising:
   chassis stands for the support of an automotive vehicle;
   a locator bed having a panel thereon, a paper removably mounted on said panel and grid indicia on said paper, said paper carrying plumb bob length information thereon; means for supporting said locator bed beneath the vehicle supported on said stands; and
   a plurality of plumb bob assemblies, each said plumb bob assembly having attachment means thereon for attachment at a particular reference location of the chassis so that each said plumb bob freely depends from its said attachment means for hanging freely to its particular said grid indicia on said paper for indicating the deviation of the particular reference locations at which each said plumb bob assembly is attached from the desired configuration of the vehicle chassis by deviation both laterally and lengthwise of said plumb bob from its said grid indicia, each said plumb bob assembly having slidable means thereon between said attachment means and said plumb bob so as to be able to adjust the distance between said attachment mans and said plumb bob in accordance with the length information on the paper.

3. A chassis gaging system comprising:
   chassis stands for the support of an automotive vehicle;
   a locator bed having a panel thereon and grid indicia on said panel;
   means for supporting said locator bed beneath the vehicle supported on said stands; and
   a plurality of plumb bob assemblies, each said plumb bob assembly having attachment means thereon comprising a U-shaped spring having at least one engagement hook thereon, said U-shaped spring being dimensioned so that it can be manually compressed and inserted into a reference location opening in a chassis and upon release engages in the reference location opening for detachable securement of said plumb bob assembly to the chassis at a particular reference location of the chassis, each said plumb bob assembly having slidable means thereon between said attachment means and said plumb bob so as to be able to adjust the distance between said attachment means and said plumb bob so that each said plumb bob freely depends from its said attachment means for hanging freely to its particular side grid indicia for indicating the deviation of the particular reference locations at which each said plumb bob assembly is attached from the desired configuration of the vehicle chassis by deviation both laterally and lengthwise of said plumb bob from its said grid indicia.

4. A chassis gaging system comprising:

chassis stands for the support of an automotive vehicle;

a locator bed having a panel thereon and grid indicia on said panel;

means for supporting said locator bed beneath the vehicle supported on said stands; and a plumb bob assembly, attachment means for attachment of said plumb bob assembly at a reference location on the vehicle chassis for having its plumb bob hang freely to said grid indicia for indicating the deviation of the particular reference location at which said plumb bob assembly is attached from the desired configuration of the vehicle chassis by deviation of said plumb bob from said grid indicia, said attachment means comprising a U-shaped spring having at least one engagement hook thereon, said U-shaped spring being dimensioned so that it can be manually compressed and inserted into a reference location opening in a chassis and upon release engages in the reference location opening for detachable securement of said plumb bob assembly to the chassis, said plumb bob assembly including a shank having an enlarged end thereon, said U-shaped spring having a slot therein with said enlarged end engaged interiorly of said U-shaped spring so that said shank can slide around said slot.

5. A chassis gaging system comprising:

chassis stands for the support of an automotive vehicle;

a locator bed having a panel thereon and grid indicia on said panel;

means for supporting said locator bed beneath the vehicle supported on said stands; and a plumb bob assembly for attachment at a reference location on the vehicle chassis for having its plumb bob hang freely to said grid indicia for indicating the deviation of the particular reference location at which said plumb bob assembly is attached from the desired configuration of the vehicle chassis by deviation of said plumb bob from said grid indicia, said plumb bob assembly including attachment means comprising a U-shaped spring having at least one engagement hook thereon, said U-shaped spring being dimensioned so that it can be manually compressed and inserted into a reference location opening in a chassis and upon release engages in the reference location opening for detachable securement of said plumb bob assembly to the chassis, said plumb bob assembly including a shank having an enlarged end thereon said shank having a tubular body secured thereto and a rod movably mounted in said tubular body and a flexible member attached to said rod and to said plumb bob to permit said plumb bob to depend from said attachment means, said U-shaped spring having a slot therein with said enlarged end engaged interiorly of said U-shaped spring so that said shank can slide around said slot.

6. A chassis gaging system comprising:

chassis stands for support of an automotive vehicle;

a locator bed having a plurality of panels thereon, each of said panels carrying grid indicia thereon, said locator bed being removable;

means for supporting said locator bed including support pads on said chassis stands so that said locator bed is supported with respect to the chassis; and a plumb bob assembly for attachment to a particular reference location in the vehicle chassis for having its plumb bob hang freely to said grid indicia for indicating the deviation of the particular reference location at which said plumb bob assembly is attached from the desired configuration of the vehicle chassis by deviation of the plumb bob from said grid indicia, said locator bed being removable to provide access to the underside of the chassis to permit bending thereof without removal of said plumb bob assembly from the chassis.

7. A chassis gaging system comprising:

chassis stands for the support of an automotive vehicle;

a locator bed comprising a frame having side rails and end rails and a plurality of panels lying across said side rails, each of said panels having grid indicia thereon with specific locator points within said indicia, said locator points representing particular reference location holes in a chassis to be gaged;

and means for supporting said locator bed including support pads on said chassis stand so that said locator bed is supported with respect to the chassis; and a plumb bob assembly for attachment to a particular reference location in the vehicle chassis for having its plumb bob hang freely to said grid indicia for indicating the deviation of the particular reference location at which said plumb bob assembly is attached from the desired configuration of the vehicle chassis by deviation of the plumb bob from said locator points, said locator bed being removable to provide access to the underside of the chassis to permit bending thereof without removal of said plumb bob assembly from the chassis.

8. A chassis gaging system comprising:

chassis stands for the support of an automotive vehicle;

a locator bed comprising a frame having side rails and end rails and a plurality of panels lying across said side rails, locator pins extending upwardly from said frame, said panels being positioned on said frame by engagement on said locator pins, each of said panels having grid indicia thereon with specific locator points within said indicia, with said locator points representing particular reference location holes in the chassis supported on said stands for gaging;

means for supporting said locator bed including support pads on said chassis stands so that said locator bed is supported with respect to the chassis; and a plumb bob assembly for attachment at a particular reference location on the vehicle chassis, said plumb bob assembly having a predetermined length for that particular location so that its plumb bob hangs freely to said grid indicia for indicating the deviation of the particular reference location at which said plumb bob assembly is attached from the desired configuration of the vehicle chassis by deviation of said plumb bob both laterally and lengthwise from said grid indicia.

9. The chassis gaging system of claim 8 wherein said grid indicia are marked on grid paper and said grid paper is removably mounted on at least one of said panels, said grid indicia including specific locator points relating to specific reference locator holes in a particular model of chassis.

10. The chassis gaging system of claim 9 wherein said plumb bob assembly is adjustable in length.

11. A chassis gaging system comprising:
chassis stands for the support of an automotive vehicle;
a locator bed having a panel thereon and grid indicia on said panel;
means for supporting said locator bed including support pads on said chassis stands so that said locator bed is supported with respect to the chassis; and
a plumb bob assembly having attachment means thereon for attachment at a particular reference location of the chassis, said plumb bob depending from said attachment means, said plumb bob assembly having a predetermined length for that particular reference location for having its plumb bob hang freely to said grid indicia for indicating the deviation of the particular reference location at which said plumb bob assembly is attached from the desired configuration of the vehicle chassis by deviation both laterally and lengthwise of said plumb bob from said grid indicia.

12. The chassis gaging system of claim 11 wherein said plumb bob assembly has slidable means thereon between said attachment means and said plumb bob so as to be able to adjust the distance between said attachment means and said plumb bob.

13. The chassis gaging system of claim 12 wherein said attachment means comprises a U-shaped spring having at least one engagement hook thereon, said U-shaped spring being dimensioned so that it can be manually compressed and inserted into a reference location opening in a chassis and upon release engages in the reference location hole for detachable securement of said plumb bob assembly to the chassis.

14. The chassis gaging system of claim 13 wherein said plumb bob assembly includes a shank having an enlarged end thereon, and said U-shaped spring has a slot therein with said enlarged end engaged interiorly of said U-shaped spring so that said shank can slide around said slide.

15. A chassis gaging system comprising:
chassis stands for the support of an automotive vehicle;
a locator bed having a panel thereon and grid indicia on said panel;
means for supporting said locator bed including support pads on said chassis stands so that said locator bed is supported with respect to the chassis, a quick release clamp mounted on at least one of said stands for clamping said locator bed with respect to said stand; and
a plumb bob assembly for attachment at a reference location on the vehicle chassis, said plumb bob assembly having a predetermined length for that particular location for having its plumb bob hang freely to said grid indicia for indicating the deviation of the particular reference location at which said plumb bob assembly is attached from the desired configuration of the vehicle chassis by deviation both laterally and lengthwise of said plumb bob from said grid indicia.

16. A chassis gaging system comprising:
chassis stands for the support of an automotive vehicle;
a locator bed and a grid paper removably mounted on said locator bed, said grid paper carrying grid indicia thereon and carrying at least one locator point thereon corresponding to a reference location in a particular model of chassis being gaged;
means for supporting said locator bed beneath the vehicle supported on said stands; and
a pair of points engaging in reference locator holes in the upper part of the chassis being gaged and a crossbar mounted on and positioned over said points, said crossbar having at least one plumb bob assembly depending therefrom, said plumb bob assembly having a predetermined length for that particular location for having its plumb bob hang freely so that said plumb bob on said plumb bob assembly is positioned with respect to said grid indicia and cooperating with a locator point on said grid paper to indicate deviation of the reference locator holes in the upper part of the chassis from standard configuration.

* * * * *